United States Patent [19]

Itoh et al.

[11] Patent Number: 4,721,364

[45] Date of Patent: Jan. 26, 1988

[54] DAZZLE-FREE MIRROR WITH PHOTOCELL IN A NON-DAZZLE-FREE PORTION

[75] Inventors: Hiroshi Itoh; Yasutoshi Suzuki, both of Obu; Tsuyoshi Fukada, Nagoya; Shinya Ohmi, Anjo; Kunihiko Hara, Nukata, all of Japan

[73] Assignee: Nippondenso Co., Ltd., Kariya, Japan

[21] Appl. No.: 767,799

[22] PCT Filed: Jan. 19, 1984

[86] PCT No.: PCT/JP84/00010

§ 371 Date: Aug. 9, 1985

§ 102(e) Date: Aug. 9, 1985

[87] PCT Pub. No.: WO85/03136

PCT Pub. Date: Jul. 18, 1985

[30] Foreign Application Priority Data

Dec. 29, 1983 [JP] Japan .................. 58-248579

[51] Int. Cl.⁴ .................. G02F 1/133; G02B 17/00
[52] U.S. Cl. .................. 350/332; 350/279; 350/338
[58] Field of Search .................. 350/338, 334, 331 R, 350/344, 278-283

[56] References Cited

U.S. PATENT DOCUMENTS

| | | | |
|---|---|---|---|
| 3,700,306 | 10/1972 | Cartmell et al. | 350/341 |
| 4,040,727 | 8/1977 | Ketchpel | 350/338 |
| 4,106,217 | 8/1978 | Witt . | |
| 4,183,628 | 1/1980 | Laesser et al. | 350/338 |
| 4,201,451 | 5/1980 | Jacob . | |
| 4,202,607 | 5/1980 | Washizuka et al. | 350/338 |
| 4,299,444 | 11/1981 | Römer | 350/278 |
| 4,623,222 | 11/1986 | Itoh et al. | 350/331 T |
| 4,632,509 | 12/1986 | Ohmi et al. | 350/338 |
| 4,634,225 | 1/1987 | Haim et al. | 350/338 |

FOREIGN PATENT DOCUMENTS

| | | | |
|---|---|---|---|
| 355436 | 1/1973 | Austria . | |
| 354269 | 2/1978 | Austria . | |
| 2808260 | 8/1979 | Fed. Rep. of Germany | 350/278 |
| 2233828 | 1/1975 | France . | |
| 2378295 | 8/1978 | France . | |
| 48-35384 | 10/1973 | Japan . | |
| 54-31106 | 9/1979 | Japan . | |
| 55-13167 | 3/1980 | Japan . | |
| 0090743 | 7/1981 | Japan | 350/338 |
| 0072122 | 5/1982 | Japan | 350/334 |

Primary Examiner—Stanley D. Miller
Assistant Examiner—David Lewis
Attorney, Agent, or Firm—Cushman, Darby & Cushman

[57] ABSTRACT

A dazzle-free reflection mirror, which may be used as an inner mirror or an outer mirror of a vehicle, has an electro-optical element of which transparency is changed by applying an electric field thereto in order to effectuate a dazzle-free operation. The dazzle-free reflection mirror comprises a dazzle-free portion to effectuate the dazzle-free operation at a lower part of the mirror surface and a non-dazzle-free portion not to effectuate the dazzle-free operation at the rest part of the mirror surface. The dazzle-free portion shields light from following-vehicle headlights at night so that the driver feels no glaring. The non-dazzle-free portion clearly images a rear view so that the driver can see an appearance of the following vehicle.

8 Claims, 13 Drawing Figures

DAZZLE-FREE MIRROR WITH PHOTOCELL IN A NON-DAZZLE-FREE PORTION

TECHNICAL FIELD

The invention relates to a dazzle-free reflection mirror of a vehicle and the manufacturing method thereof. The dazzle-free reflection mirror, which may be used as an inner mirror or an outer mirror of the vehicle, has an electro-optical element of which transparency is electrically controlled by applying an electric field thereto.

BACKGROUND ART

In the past, a dazzle-free reflection mirror has a dazzle-free portion, which comprises an electro-optical element such as a liquid crystal or an electrochromic, on the whole mirror surface for effectuating a dazzle-free operation. Thus, when the dazzle-free portion effectuates the dazzle-free operation, the reflectivity of the reflection mirror becomes so low that the rear view image can not be sufficiently assured.

However, the dazzling which the driver of the vehicle feels is not caused by light reflected on the whole mirror surface but caused by light reflected on limited area of the mirror surface. On the other hand, during the running of the vehicle at night, the image of following-vehicle headlights is usually seen in a lower part of the mirror surface.

The inventors have found the above-mentioned facts and conceived that such dazzling caught by drivers can be prevented by putting the only lower part of the mirror surface into the dazzle-free condition and that the appearance of the following vehicle can be clearly imaged on the rest part of the mirror surface, which is constructed as a non-dazzle-free portion.

It is an object of the present invention, therefore, to provide a dazzle-free reflection mirror which can image the following vehicle clearly thereon even in the dazzle-free condition.

DISCLOSURE OF INVENTION

This invention achieves the objects set forth above by providing a dazzle-free reflection mirror having an electro-optical element whose transparency is changed by applying an electric field thereto. A dazzle-free portion defined by the electro-optical element is arranged at a lower part of the mirror surface with the remainder of the mirror being a non-dazzle-free portion. At least a portion of the mirror behind the non-dazzle-free portion is translucent, allowing some light to pass therethrough. A sensor is positioned behind the translucent mirror and signals from the sensor are employed to determine whether the dazzle-free portion of the mirror should be in a dazzle-free condition or not.

By positioning the sensor behind the translucent mirror of the non-dazzle-free portion, the switching of the mirror into and from a dazzle-free condition does not affect the output of the sensor thereby simplifying circuitry employed with such a mirror.

BEST MODE OF CARRYING OUT THE INVENTION

The present invention will be described hereinunder with reference to the embodiments.

Figure 1:
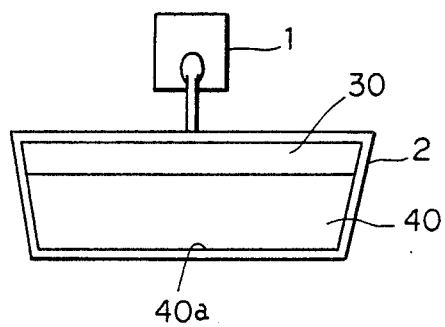
FIG. 1 is a front view of a dazzle-free reflection mirror according to the first embodiment of the present invention.
Figure 2:
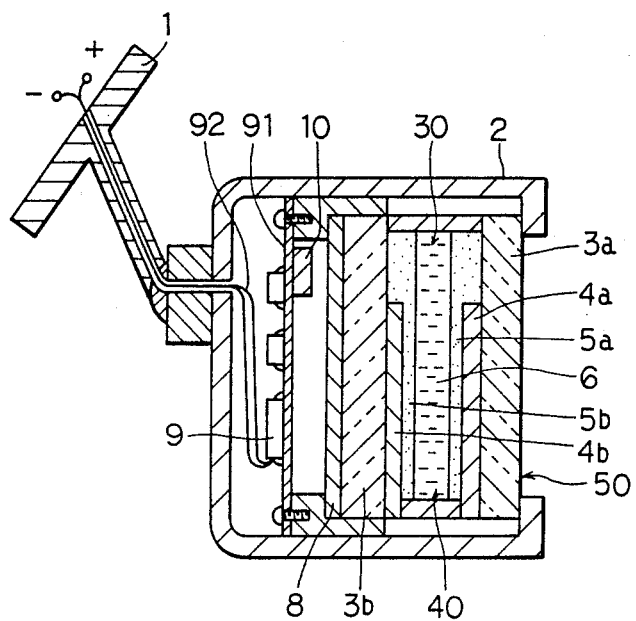
FIG. 2 is a cross-sectional view of the dazzle-free reflection mirror shown in FIG. 1.

FIG. 1 is a front view of a dazzle-free reflection mirror according to the first embodiment and FIG. 2 is a cross-sectional view thereof. This dazzle-free reflection mirror has a frame 2 and a supporting element 1 for supporting the frame 2. The frame 2 holds a liquid crystal element 50 therein. The liquid crystal element 50 comprises a dazzle-free portion 40 occupying a lower two-thirds portion from the bottom end 40a, which may occupy a lower portion between a half and five-sixths, and a non-dazzle-free portion 30 in the rest portion on the mirror surface. The dazzle-free portion 40 and the non-dazzle-free portion 30 are constructed as a unitary body. The non-dazzle-free portion 30 does not effectuate a dazzle-free operation because an electric field is not applied to the liquid crystal therein. The liquid crystal element 50 includes a transparent glass substrate 3a, a transparent electrode layer 4a made of indium tim oxide (ITO), an alignment film 5a for orientating the liquid crystal parallelly, a liquid crystal layer 6 made of a nematic liquid crystal acting as a DSM (dynamic scattering mode) liquid crystal, a transparent electrode layer 4b, a transparent glass substrate 3b, and a semi-transparent or a translucent mirror layer 8, being stacked in this order from the light incident side. The dazzle-free portion 40 is so arranged that the transparency thereof is electrically controlled by applying a voltage to the electrode layers 4a and 4b so that the liquid crystal layer therein moves into the dynamic scattering mode. The thicknesses of the transparent electrodes 4a and 4b and orientation films 5a and 5b are respectively 1000 Å. The thickness of the liquid crystal layer 6 is 10 μm. The translucent mirror layer 8 is made of aluminum, of which thickness is 300 Å.

In the non-dazzle-free portion 30, the transparent electrode layers are not respectively formed on the transparent glass substrates 3a and 3b so that the electric field is not applied to the liquid crystal therein.

On the other hand, a photo diode 10, as a photo sensor, for detecting light incident through the non-dazzle-free portion 30 is located behind the liquid crystal element 50. The photo diode 10 is attached on a base plate 91 supporting a driving circuit 9. The driving circuit 9 drives the liquid crystal element 50 to put the dazzle-free portion 40 into the dazzle-free condition during the photo diode 10 detects that the intensity of light incident through the non-dazzle-free portion 30 is higher than a predetermined value. The driving circuit 9 is supplied with voltage through voltage supply lines 92 from a battery mounted on the vehicle. The circuit including the driving circuit 9 is shown in FIG. 3.

Figure 3:
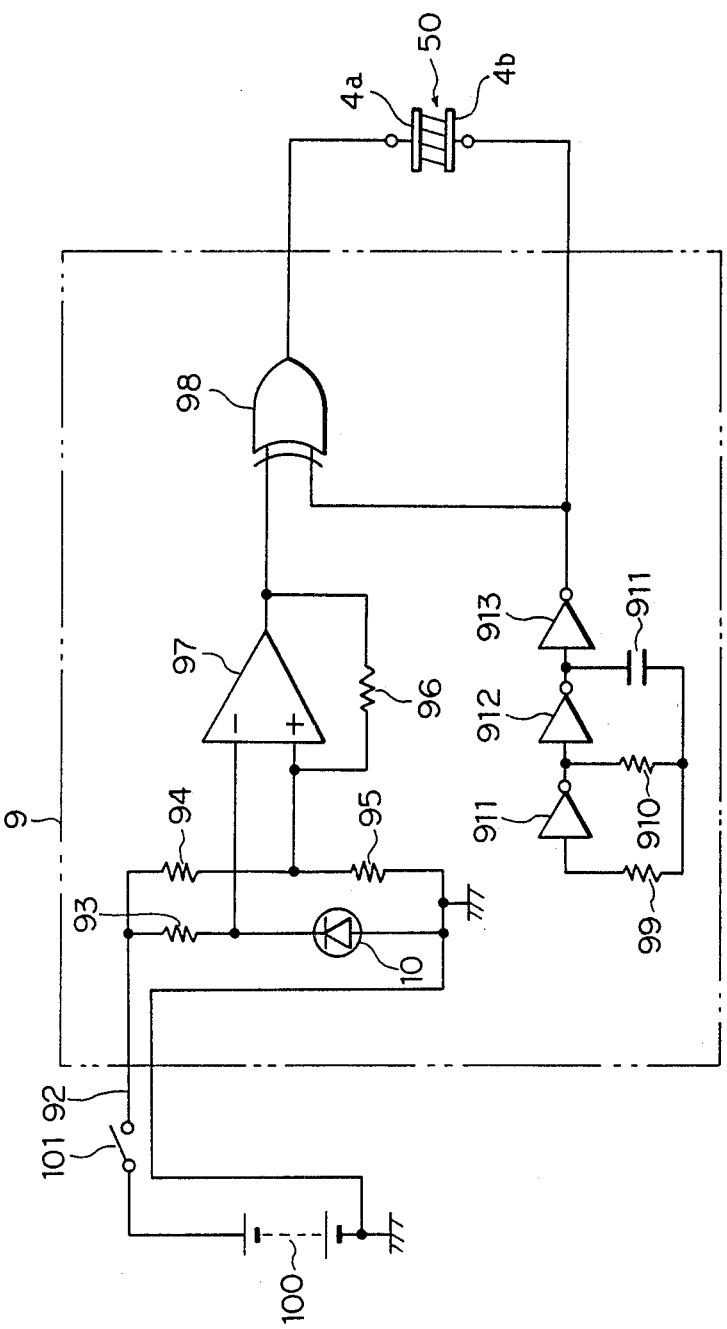
FIG. 3 is an electric circuit diagram showing a driving circuit to effectuate a dazzle-free operation.

In FIG. 3, provided that a light switch 101 is turned on, the driving circuit 9 to which the voltage is supplied from the battery becomes operative. At this time, provided that the photo diode 10 receives light of a high-level intensity, the voltage of an inverting input terminal of a comparator 97 becomes low. When the voltage of the inverting input terminal becomes lower than the voltage dividing a battery voltage by resistors 94 and 95, the output voltage of the comparator 97 becomes high, thereby being applied to the input terminal of an exclusive-OR circuit 98. On the other hand, the oscillation signal of an oscillation circuit, which comprises C-MOS inverter circuits 911, 912 and 913, resistors 99 and 910 and a capacitor 911, is respectively applied to the other input terminal of the exclusive-OR circuit 98 and the transparent electrode layer 4b. When the output of the comparator 97 becomes high, the output voltage of the exclusive-OR circuit 98 becomes in the opposite phase relation with the oscillation signal. Accordingly, an alternating current voltage is applied between the transparent electrode layers 4a and 4b of the liquid crystal element 50, so that the dazzle-free portion 40 is put into the dazzle-free condition.

On the other hand, when the intensity of light received by the photo diode 10 becomes lower than the predetermined value, the output voltage of the comparator 97 becomes low so that the output voltage of the exclusive-OR circuit 98 becomes in the same phase relation with the oscillation signal. Accordingly, the voltages applied to the transparent electrode layers 4a and 4b become in the same relation, so that no voltage is applied to the liquid crystal layer 6. As a result, the dazzle-free portion 40 of the liquid crystal element 50 is not put into the dazzle-free condition. In the above-described circuit, a resistor 96 provides the comparator 97 with a hysteresis function. Although not shown in FIG. 3, the comparator 97, the exclusive-OR circuit 98, and c-MOS invertor circuits 911, 912 and 913 are supplied with the voltage through the voltage supply lines 92 from the battery thereby to become operative.

It should be noted in the above-described embodiment that, the transparent electrode layers 4a and 4b can be made of tin dioxide ($SnO_2$) or titanium dioxide ($tiO_2$) instead of the ITO. Further, in the translucent layer 8, the ratio between transparency and reflectivity thereof can be set appropriately by vapor-depositing metal or nonmetal film of an optional thickness to the transparent glass substrate 3b. For instance, zinc sulfide (ZnS) or ceric oxide ($CeO_2$) of which film thickness is equal to a quarter of light wave-length can be used as the translucent layer 8. Aluminum, silver, chromium or gold can be likewise used as the translucent layer 8.

Figure 4:
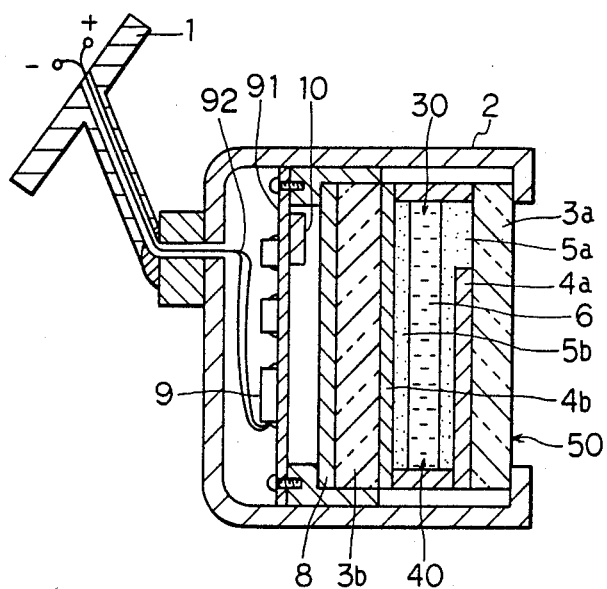
FIG. 4 is a cross-sectional view of a dazzle-free reflection mirror according to a modification of the first embodiment.

In the above-described first embodiment, the dazzle-free portion 40 and non-dazzle-free portion 30 are manufactured by not forming transparent electrode layers at a region corresponding to the non-dazzle-free portion 30. The non-dazzle-free portion 30 may be constructed by eliminating only a part of one of the transparent electrode layers, which region corresponds to the non-dazzle-free portion 30 as shown in FIG. 4.

The second embodiment of the present invention will be next described.

Figure 5:
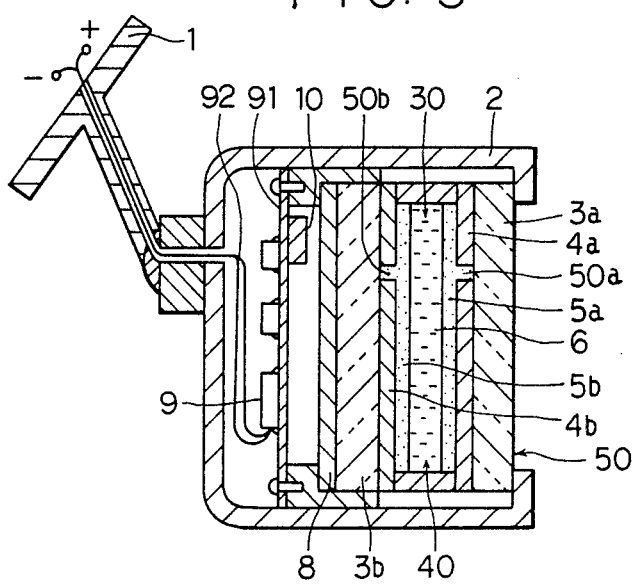
FIG. 5 is a cross-sectional view of a dazzle-free reflection mirror according to the second embodiment of the present invention.

The dazzle-free reflection mirror according to the second embodiment is, as shown in FIG. 5, so arranged that the dazzle-free portion 40 and the non-dazzle-free portion 30 are constructed by forming slits 50a and 50b in the transparent electrode layers 4a and 4b, respectively. As a result, the electric field is applied to only the liquid crystal layer 6 in the dazzle-free portion 40 to effectuate the dazzle-free operation.

The third embodiment of the present invention will be described next.

Figure 6:
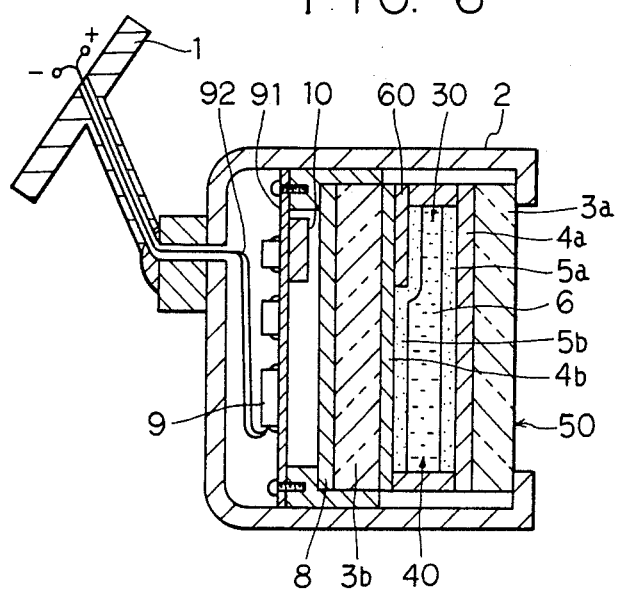
FIG. 6 is a cross-sectional view of a dazzle-free reflection mirror according to the third embodiment of the present invention.

FIG. 6 is a cross-sectional view of the dazzle-free reflection mirror according to the third embodiment.

In this embodiment, a transparent insulation film 60 is formed on a part of the transparent electrode layer 4b, which region corresponds to the non-dazzle-free portion 30. As a result, the electric field is not applied to the liquid crystal layer in the non-dazzle-free portion 30 due to the transparent insulation film 60. The transparent insulation film 60 can be formed by vacuum-depositing or sputtering aluminum oxide ($Al_2O_3$), silicon monoxide (SiO), silicon dioxide ($SiO_2$), titanium dioxide ($TiO_2$) or magnesium defluoride ($MgF_2$), or can be formed by anodic-oxidating the electrode formed by aluminum.

It should be noted in the above-described embodiments that, although the translucent mirror layer 8 may be provided, a complete reflection mirror layer may be provided instead of the translucent mirror layer 8 in case the photo diode 10 is provided anywhere else than behind the reflection mirror layer. Further, the electrode layer 4b may be used as the translucent mirror layer or the complete reflection mirror layer.

Figure 7:
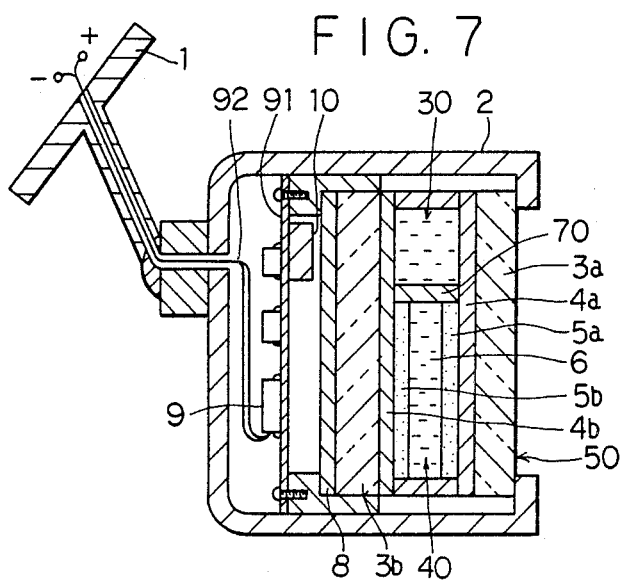
FIG. 7 is a cross-sectional view of a dazzle-free reflection mirror according to the fourth embodiment of the present invention.

The fourth embodiment of the present invention will be then described. FIG. 7 is a cross-sectional view of the reflection mirror according to this embodiment. In this embodiment, the dazzle-free portion 40 and non-dazzle-free portion 30 are separated from each other by a seal material 70. The non-dazzle-free portion 30 comprises material that is not electrically conductive between the electrode layers 4a and 4b. As the non-electric conductive material, the air, silicon oil, silicon rubber, silicon resin, or epoxy resin can be used.

Figure 8:
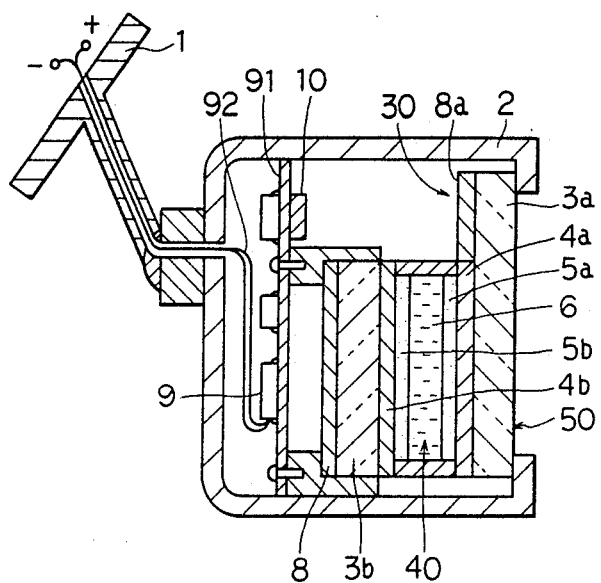
FIG. 8 is a cross-sectional view of a dazzle-free reflection mirror according to the fifth embodiment of the present invention.

The fifth embodiment will be described next. FIG. 8 is a cross-sectional view of the reflection mirror according to this embodiment. In this embodiment, the non-dazzle-free portion 30 comprises a translucent mirror layer 8a directly formed on the transparent glass substrate 3a. On the other hand, in the dazzle-free portion 40, the complete reflection mirror layer 8 is formed on the transparent glass substrate 3b by vacuum-depositing aluminium of which thickness is 300 Å. Although the translucent mirror layer 8a is formed on the transparent glass substrate 3b in the above-described non-dazzle-free portion 30, a complete reflection mirror layer may be formed instead of the translucent mirror layer 8a in case the photo diode 10 is provided anywhere else than behind the reflection mirror layer.

Figure 9:
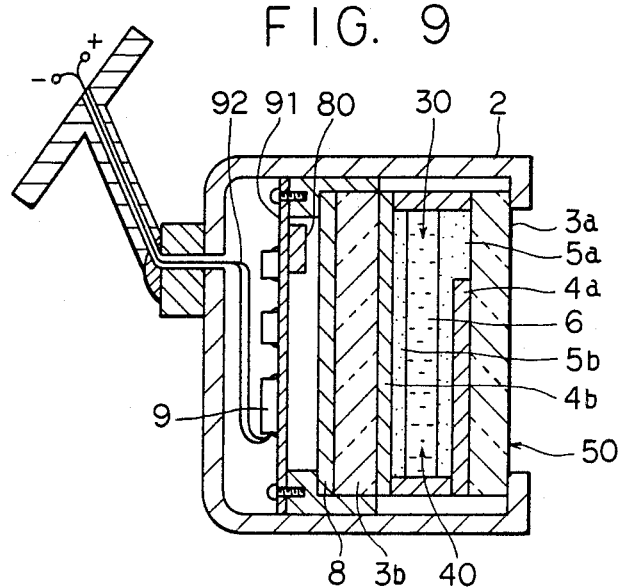
FIG. 9 is a cross-sectional view of a dazzle-free reflection mirror according to the sixth embodiment of the present invention.
Figure 10:
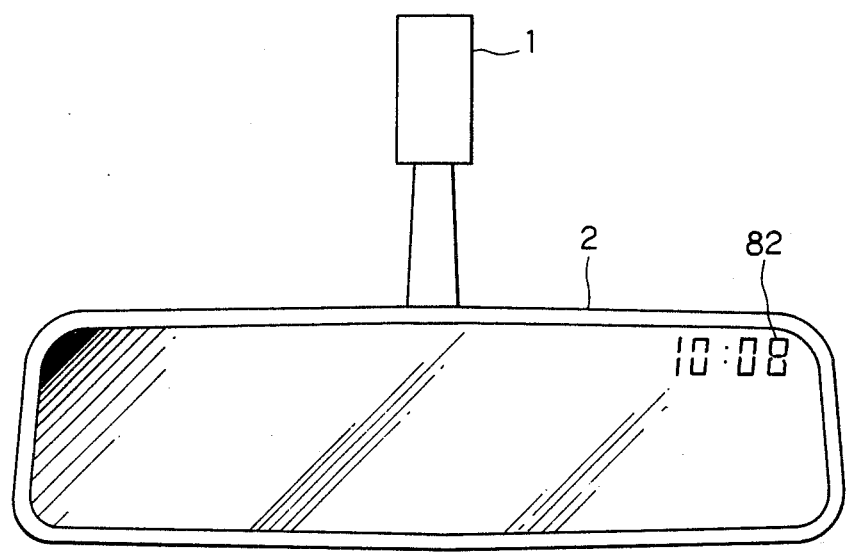
FIG. 10 is a front view of the dazzle-free reflection mirror shown in FIG. 9.

The sixth embodiment will be described next. FIGS. 9 and 10 are respectively a cross-sectional view and a front view of the reflection mirror of this embodiment. In this embodiment, the liquid crystal element 50 is the same structure as that shown in FIG. 4. A display device 80 composed of LEDs is provided behind the non-dazzle-free portion 30. The display device 80 displays time at display portion 82 shown in FIG. 10. This embodiment is characterized in that the displayed time on the display device 80 behind the liquid crystal element 50 can be seen through the non-dazzle-free portion 30 since the transparency of the non-dazzle-free portion 30 is not changed.

Figure 11:
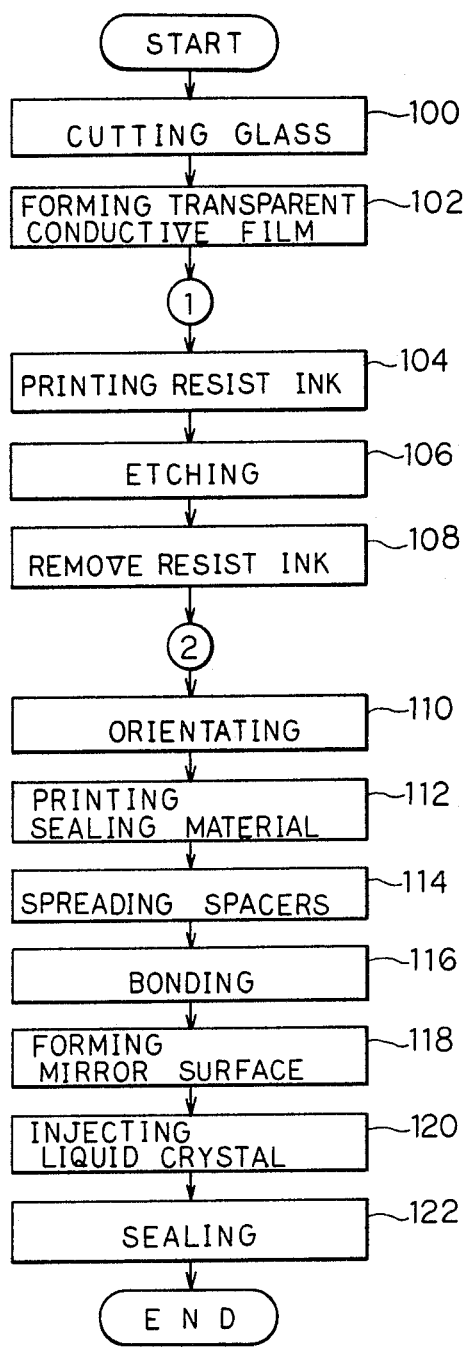
FIG. 11 is a flow chart showing a series of processing steps for manufacturing the embodiment.

The manufacturing method according to the present invention will be explained with reference to the embodiments. FIG. 11 is a flow chart showing a series of processing steps according to this embodiment. This embodiment is characterized in that portion of the transparent electrode layers are eliminated by etching to form the non-dazzle-free portion 30 as shown in FIG. 2.

Firstly, at a step 100, soda glass is cut in a shape of transparent glass substrate. At a step 102, a transparent conductive film is formed on the glass substrate as an electrode. The transparent conductive film is made of indium tin oxide in which weight percentage ratio between $In_2O_3$ and $SnO_2$ is 95:5 and is formed to film thickness of 1000 Å by an electron beam deposition under 350° C.–400° C. and oxygen partial pressure of $1 \times 10^{-2}$pa–$5 \times 10^{-2}$Pa. Next, at a step 104, acid-resistant resist ink is printed on the transparent conductive film over a whole range corresponding to the dazzle-free portion 40 so that a masking is provided. At a step 106 thereafter, the substrate with the transparent conductive film is dipped in a fluid solution mixture of concentrated hydrochroric acid and water in 1:1 ratio under temperature of 45° C. for two minutes so that surrounding portions of the transparent conductive film corresponding to the non-dazzle-free portion 30 is removed therefrom. At a step 108, the resist ink is removed by the use of organic solvent, trichloroethylene. Then, at a step 110, alignment processing is done to align the liquid crystal parallelly. In the orientating processing, polyimide solution is slushed by a spinner at 3500 rpm and thereafter the substrate is maintained at temperatures of 300° C. for 30 minutes and 400° C. for 30 minutes and fired thereby to form an alignment film on the conductive film. Then rubbing the alignment film is done by the use of chemical fiber cloth to provide alignment of liquid crystal filled in later. At a step 112, sealing material is printed on side portions by the use of epoxy resin. Further, at a step 114, glass fiber particles in particle diameter of 10 um are spread as spacers on the alignment film. At a step 116, a pair of glass substrates, each being processed as above-described, are put one upon another in parallel and maintained under temperature of 100° C. for 2 hours for bonding so that a liquid crystal cell is provided. At a step 118, chromium film is vapor-deposited on the other end surface of one of the transparent glass substrates under the condition that the substrate is maintained under temperature of 100° C. to form the translucent mirror layer 8 of 300 Å. At a step 120, liquid crystal is filled in an inner space of the liquid crystal cell by a decompressed injection process. At a step 122, an injection opening is sealed with epoxy adhesive. Through the above-described processes, the liquid crystal element 50 comprising the dazzle-free portion 40 and the non-dazzle-free portion 30 is formed.

Figure 12:
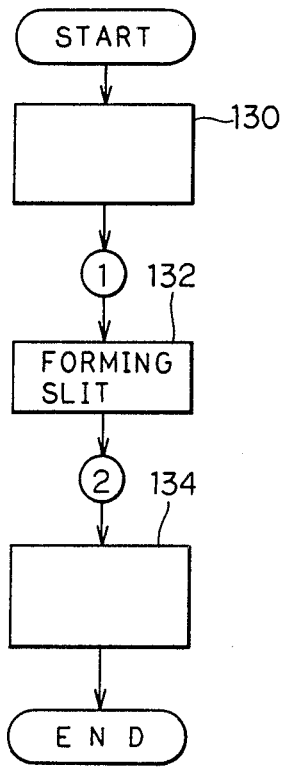
FIG. 12 is a flow chart showing a series of processing steps for manufacturing the modified embodiment.

A modified manufacturing method will be explained with reference to FIG. 12 showing the flow chart of a series of processing steps according to the modified embodiment. A step 130 corresponds to the steps 100 and 102 shown in FIG. 11. At a step 132, a slit formed in the transparent conductive film to separate the non-dazzle-free portion 40 from the dazzle-free portion 30 by the same eliminating means as shown in the steps 104 and 108. The slit insulates the separated transparent conductive films from each other. The slit may be formed by cutting with the edge of a steel blade or a laser instead of the etching. A step 134 corresponds to the steps 110 to 122 shown in FIG. 11.

Figure 13:
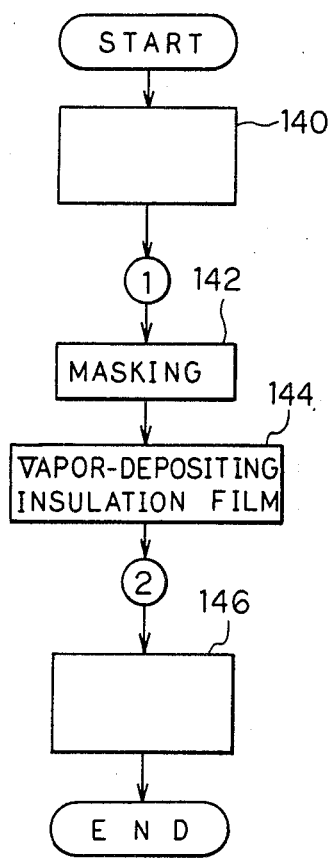
FIG. 13 is a flow chart showing a series of processing steps for manufacturing a further modified embodiment.

A further modified embodiment of the manufacturing method will be explained with reference to FIG. 13 showing a flow chart of a series of modified processing steps. A step 140 corresponds to the steps 100 and 102 shown in FIG. 11. At a step 142, a whole range corresponding to the dazzle-free portion 40 is masked by metal. At a step 144 thereafter, an insulation film is formed by vapor-depositing SiO on a surface of the transparent conductive film over a whole range corresponding to the non-dazzle-free portion 30. Thus, the non-dazzle-free portion 30 is formed. A step 146 corresponds to the steps 110 to 122 shown in FIG. 11.

The liquid crystal element for the dazzle-free reflection mirror is manufactured in accordance with one of the above-mentioned manufacturing methods.

It should be noted that the alignment processing may be done by oblique vapor-depositing of SiO (incident angle: 80°, thickness: 500 Å). On the other hand, the mirror layer may be formed on the substrate by vapor-depositing aluminum or silver under temperature of 100° C. so that the film thickness becomes 300 Å or 250Å, respectively.

INDUSTRIAL APPLICABILITY

The dazzle-free reflection mirror according to the present invention can be applied to the inner mirror or the outer mirror of a vhicle.

What we claim is:

1. A dazzle-free reflection mirror having a mirror surface, comprising:
   an electro-optical element of which transparency is changed by applying an electric field thereto extending over a lower portion of said mirror surface to be dazzle-free, a remaining portion of said mirror surface being non-dazzle-free;
   means for reflecting light provided behind said electro-optical element and said non-dazzle-free portion, at least the portion of said reflection means provided behind said non-dazzle-free portion being a translucent mirror layer passing a part of incident light therethrough;
   means, provided behind said translucent mirror layer, for detecting light incident through said non-dazzle-free portion and said translucent mirror layer; and
   means for applying an electric field to said electro-optical element to effectuate the dazzle-free operation of said dazzle-free portion in response to the detection of said light detecting means, whereby only said dazzle-free portion of said mirror surface can assume a dazzle-free condition.

2. A reflection mirror according to claim 1, wherein said dazzle-free portion occupys a lower portion between a half and five-sixths from a bottom end.

3. A reflection mirror according to claim 1, wherein said electro-optical element is provided between a pair of parallel electrode layers, and said dazzle-free portion and said non-dazzle-free portion are constructed by eliminating a portion of at least one of said pair of electrode layers.

4. A reflection mirror according to claim 1, wherein said electro-optical element is provided between a pair of parallel electrode layers, and said dazzle-free portion and said non-dazzle-free portion are constructed by forming a slit on at least one of said pair of electrode layers so that electrode layers separated by said slit are electrically insulated each other.

5. A reflection mirror according to claim 1, wherein said electro-optical element is provided between a pair of parallel electrode layers, and said dazzle-free portion and said non-dazzle-free portion are constructed by forming a transparent insulation film on a portion of at least one of said pair of electrode layers.

6. A reflection mirror according to claim 1, said dazzle-free portion is constructed by providing said electro-optical element in a portion between a pair of parallel electrode layers and said non-dazzle-free portion is constructed by providing material that is not electrically conductive in the rest portion.

7. A reflection mirror according to claim 1, wherein said dazzle-free portion and said non-dazzle-free portion have a common glass substrate and said translucent mirror layer is formed on a part of said common glass substrate corresponding to said non-dazzle-free portion.

8. A reflection mirror according to claim 1, further comprising light-emitting and display means, provided behind said non-dazzle-free portion, for emitting light indicative of a predetermined display through said translucent mirror layer and said non-dazzle-free portion.

* * * * *